(12) United States Patent
Spagnoli et al.

(10) Patent No.: US 11,001,173 B2
(45) Date of Patent: May 11, 2021

(54) RECLINING DEVICE FOR A VEHICLE SEAT

(71) Applicant: MARTUR ITALY S.R.L., Milan (IT)

(72) Inventors: Luigi Spagnoli, Orbassano (IT); Can Ustunberk, Orbassano (IT)

(73) Assignee: MARTUR ITALY S.R.L., Milan (IT)

( * ) Notice: Subject to any disclaimer, the term of this patent is extended or adjusted under 35 U.S.C. 154(b) by 57 days.

(21) Appl. No.: 16/471,739

(22) PCT Filed: Jan. 30, 2019

(86) PCT No.: PCT/IB2019/050749
§ 371 (c)(1),
(2) Date: Jun. 20, 2019

(87) PCT Pub. No.: WO2019/202409
PCT Pub. Date: Oct. 24, 2019

(65) Prior Publication Data
US 2021/0023968 A1 Jan. 28, 2021

(30) Foreign Application Priority Data

Apr. 18, 2018 (IT) .......................... 102018000004672

(51) Int. Cl.
*B60N 2/22* (2006.01)
*B60N 2/23* (2006.01)
*B60N 2/235* (2006.01)

(52) U.S. Cl.
CPC ......... *B60N 2/2362* (2015.04); *B60N 2/2227* (2013.01)

(58) Field of Classification Search
CPC ...... B60N 2/22; B60N 2/2231; B60N 2/2227; B60N 2/2356; B60N 2/2362
See application file for complete search history.

(56) References Cited

U.S. PATENT DOCUMENTS 5,871,414 A * 2/1999 Voss ..................... B60N 2/2254
475/175
6,619,743 B1 * 9/2003 Scholz .................. B60N 2/225
297/362

(Continued)

FOREIGN PATENT DOCUMENTS

EP 2272707 A2 * 1/2011 ........... B60N 2/2252
EP 2272707 A2 1/2011

(Continued)

*Primary Examiner* — Ryan D Kwiecinski
(74) *Attorney, Agent, or Firm* — Howson & Howson LLP

(57) ABSTRACT

The present invention relates to a reclining device (1) for a vehicle seat of the kind comprising a first plate carrying an internal gear (5) and a second plate carrying an external gear (11) configured to cooperate with the internal gear. The reclining device includes a first and second wedge elements (17a, 17b) for exerting a wedge effect and preventing accidental, undesired rotation of the external and internal gears relative to each other. The reclining device (1) further comprises a lock spring (21). According to the invention the lock spring (21) comprises a wedge engaging element (35) that can be brought to abut and engage a lock spring abutment surface (37a, 37b) of a wedge element. Thanks to this arrangement, the lock spring directly interacts with the wedge elements and directly restricts self-rotation of said wedge elements, which avoids any loss of force and function between said lock spring and said wedge elements.

8 Claims, 6 Drawing Sheets

(56) References Cited

U.S. PATENT DOCUMENTS

| | | | | |
|---|---|---|---|---|
| 7,090,298 | B2* | 8/2006 | Lange | B60N 2/2252 297/362 |
| 7,090,299 | B2* | 8/2006 | Lange | B60N 2/2252 297/362 |
| 7,648,203 | B2* | 1/2010 | Voss | B60N 2/2252 297/362 |
| 8,540,317 | B2* | 9/2013 | Stilleke | B60N 2/2254 297/362.11 |
| 8,746,796 | B2* | 6/2014 | Wei | B60N 2/2252 297/362 |
| 8,905,479 | B2* | 12/2014 | Lehmann | B60N 2/225 297/362 |
| 8,931,842 | B2* | 1/2015 | Hiemstra | B21D 53/28 297/362 |
| 8,944,508 | B2 | 2/2015 | Ohba et al. | |
| 8,950,811 | B2* | 2/2015 | Narita | B60N 2/2252 297/362 |
| 9,016,153 | B2* | 4/2015 | Kirubaharan | B60N 2/2252 74/89.45 |
| 9,039,088 | B2 | 5/2015 | Lehmann et al. | |
| 9,050,912 | B2* | 6/2015 | Assmann | B60N 2/2356 |
| 9,167,898 | B2* | 10/2015 | Wahls | B60N 2/2252 |
| 9,205,764 | B2* | 12/2015 | Hiemstra | B60N 2/2252 |
| 9,242,582 | B2* | 1/2016 | Thiel | B60N 2/2252 |
| 9,315,122 | B2* | 4/2016 | Wingensiefen | B60N 2/2254 |
| 9,706,844 | B2* | 7/2017 | Sakurai | A47C 1/024 |
| 10,065,538 | B2* | 9/2018 | Desquesne | B60N 2/20 |
| 10,183,594 | B2* | 1/2019 | Kim | B60N 2/2356 |
| 10,399,466 | B2* | 9/2019 | Chang | B60N 2/2252 |
| 10,493,870 | B2* | 12/2019 | Oishi | B60N 2/2213 |
| 2009/0224588 | A1* | 9/2009 | Matsumoto | B60N 2/2254 297/362 |
| 2010/0308634 | A1 | 12/2010 | Narita et al. | |
| 2013/0319144 | A1 | 12/2013 | Kirubaharan et al. | |
| 2014/0097659 | A1* | 4/2014 | Wahls | B60N 2/2252 297/362 |
| 2015/0246625 | A1* | 9/2015 | Leconte | B60N 2/2252 297/361.1 |

FOREIGN PATENT DOCUMENTS

| | | | | |
|---|---|---|---|---|
| EP | 2640600 B1 * | 3/2017 | | A47C 7/462 |
| KR | 101427094 B1 * | 8/2014 | | B60N 2/2254 |

\* cited by examiner

RECLINING DEVICE FOR A VEHICLE SEAT

TECHNICAL FIELD OF THE INVENTION

The present invention relates to a reclining device for a vehicle seat. More particularly, the present invention relates to a reclining device for a vehicle seat with improved operational responsiveness and functional reliability.

PRIOR ART

Vehicle seats generally have a sliding function for pushing or pulling the seat cushion in a forward or backward direction, a height adjustment function for adjusting the height of the seat cushion and a reclining function for adjusting the inclination of the seat backrest relative to the seat cushion.

This reclining function is generally implemented by a reclining device arranged at the junction between the seat cushion and the seat backrest.

Reclining devices are known from the art which comprise a first plate attached to the seat cushion and including an internal gear and a second plate attached to the seat backrest and including an external gear, or vice versa. The external gear is eccentrically arranged with respect to the internal gear and the teeth of a portion of the outer circumference of the external gear mesh with the teeth of a respective portion of the inner circumference of the internal gear. A driver is arranged for rotating the external gear and the internal gear relative to each other in order to modify the inclination of the seat backrest with respect to the seat cushion.

In order to prevent an accidental, undesired rotation of the external gear and the internal gear relative to each other, a pair of wedge elements are arranged in the space between the hub of the internal gear and a bearing fitted in a central hole of the external gear. As the external gear is eccentrically arranged with respect to the internal gear, the space defined between the said hub of the internal gear and said bearing integral to the external gear is crescent-shaped. Accordingly, the wedge elements, which have the same configuration and are arranged symmetrically to each other, have a wider portion and a narrower portion: the wedge elements are arranged in the crescent-shaped space so that their wider portions face each other near the middle part of the crescent-shaped space, while their narrower portions are oriented towards respective, opposite sides of said crescent-shaped space.

The reclining device further comprises a wedge spring, which has an omega-shape comprising a circular portion ending with two, parallel arms, each of said arms engaging a respective wedge element, which is correspondingly provided with a suitable seat for the spring arm. The wedge spring biases the wedge elements apart from each other, so that they are pushed towards the opposite ends of the crescent-shaped space and press against the surfaces of the hub of the internal gear and of the bearing integral to the external gear, thus exerting their wedge effect and preventing rotation of the external and internal gears relative to each other.

When the user wishes to modify the inclination of the seat backrest relative to the seat cushion, the driver is rotated, either clockwise or counter-clockwise, until a cam-shaped element integral to the driver abuts against the first or the second wedge element (depending on the direction of the rotation). By a further rotation of the driver, the cam-shaped element pushes the wedge element and, overcoming the resistance of the wedge spring, allows said wedge elements to move away from the end of the crescent-shaped space (thus releasing the pressure against the hub of the internal gear and the bearing integral to the external gear) and to come closer to the other wedge element, until eventually contacting it. A further rotation of the driver makes the wedge element push the other wedge element and thus causes a rotation of the external gear relative to the internal gear. An adjustment of the inclination of the seat backrest relative to the seat cushion is thus obtained.

Reclining devices of the kind described above are shown, for instance in documents US 2010/0308634, EP 2 272 707 and EP 2 586 650.

In order to inhibit changing or creeping of the seat backrest to a position that differs from that at which it is initially set, the reclining device may further comprise a lock spring. Typically, such a lock spring is made as a thin metal plate and is arranged between the wedge elements and the wedge spring.

U.S. Pat. No. 9,167,898 discloses a reclining device comprising such a lock spring.

As shown in U.S. Pat. No. 9,167,898, the lock spring is interposed between the wedge elements and the wedge spring and it is provided with a pair of windows through which the wedge spring arms pass for engaging the corresponding seats in the wedge elements.

In a normal condition, the lock spring is in a locked state and rotation of the reclining device is inhibited.

When the lock spring is in a locked condition, undesired self-rotation of the wedge elements is restricted by the wedge spring, an arm of which will become engaged with the edge of the corresponding window of the lock spring. However, such a configuration has some relevant drawbacks, mainly connected to the functional and operational cooperation between the wedge spring and the lock spring.

US 2013/0319144 also discloses a reclining device comprising a lock spring. In the reclining device disclosed in US 2013/0319144, too, the lock spring is interposed between the wedge elements and the wedge spring.

In the reclining device disclosed in US 2013/0319144, the lock spring is not provided with any means for directly engaging either of the wedge elements at its wider portion, i.e. at the middle part of the crescent-shaped space receiving said wedge elements, thus preventing undesired self-rotation of the wedge element in the direction towards said middle part of said crescent-shaped space.

The main object of the present invention is to obviate to such drawbacks, by providing a reclining device in which the operation of the lock spring is simpler and more reliable. This and other objects are achieved by a reclining device as claimed in the appended claims.

SUMMARY OF THE INVENTION

The present invention relates to a reclining device for a vehicle seat comprising:
  a first plate including an internal gear and a second plate including an external gear, said external gear being eccentrically arranged with respect to said internal gear and the teeth of said external gear meshing the teeth of said internal gear at a portion of the circumferences of said gears;
  a first and second wedge elements, configured to exert a wedge effect for preventing rotation of said external gear and said internal gear relative to each other, and a wedge spring biasing said wedge elements to the configuration in which they exert said wedge effect;

a driver for causing the external gear and the internal gear to rotate relative to each other for adjusting the inclination of the second plate with respect to the first plate; and a lock spring, that is switchable from a locked to an unlocked state for selectively preventing or allowing rotation of the reclining device, wherein said lock spring is integral in rotation with the driver when in its locked state and is not integral in rotation with the driver when in its unlocked state According to the invention, the lock spring comprises a wedge engaging element that can be brought to abut and engage the first or the second wedge element.

Advantageously, according to the invention, in the locked condition of the reclining device undesired self-rotation of the wedge elements is restricted directly by the lock spring through said wedge engaging element, instead that by one of the arm of the wedge spring as in prior art.

The direct interaction between the lock spring and the wedge elements advantageously makes the chain of kinematic transmission simpler and avoids any loss of force and function between the lock spring and the wedge elements, thus rendering the reclining device more reliable.

The wedge elements will correspondingly be provided with a lock spring abutment surface, against which the wedge engaging element of the lock spring can be brought to abut and engage.

Advantageously, according to the invention the lock spring does not need to be interposed between the wedge spring and the wedge elements; on the contrary, it can be arranged on the side of the wedge elements opposite to the wedge spring, which enhances the cooperation of the wedge elements both with the wedge spring and with the lock spring.

According to a preferred embodiment of the invention, the lock spring has a body made as a thin plate and the wedge engaging element is made as a tab which is bent so to be substantially perpendicular to the plane of the lock spring body.

Accordingly, the wedge elements, at their wider ends facing each other, are provided with a sliding surface which is substantially parallel to the lock spring tab and ends with an abutment surface which is substantially perpendicular to the lock spring tab.

According to a further aspect of the present invention, each of the wedge elements has a width gradually decreasing from its wider end to its narrower end and the width of the wedge element does not decrease uniformly.

On the contrary, the inner surface of the wedge element is subdivided in at least two sections having different curvature radii. Namely, the section of the inner surface of the wedge element close to its wider end has a curvature radius which is smaller than the curvature radius the section of the inner surface of the wedge element close to its narrower end.

Thanks to this configuration, only the section of the inner surface of the wedge element close to its wider end contacts the hub of the internal gear, while a gap is formed between the section of the inner surface of the wedge element close to its narrower end and said hub.

Advantageously, a reduced contact surface between the wedge element and the hub implies a reduced friction and a reduced effort for adjusting the inclination of the seat backrest relative to the seat cushion.

According to a further aspect of the present invention, the wedge elements have a stepped contour shape which prevents the wedge engaging element of the lock spring from coming in contact with the inner surface of the bearing coupled to the external gear, thus avoiding rubbing of the bearing surface.

In a preferred embodiment of the invention, the number of teeth of the external gear is different from the number of teeth of the internal gear, namely lower than the number of teeth of the internal gear.

The combination of the inner surface of the wedge element with different curvature radii and the external gear with a number of teeth lower than the internal gear allows to obtain a new involute trace.

According to another aspect of the invention, the reclining device further includes a dust cover for protecting the greased components of the reclining device from dust and dirt and the dust cover and the driver are made as a single piece.

This advantageously reduces the number of parts of the reclining device and makes the assembling of the reclining device easier.

BRIEF DESCRIPTION OF THE DRAWINGS

Further features and advantages of the invention will become more evident from the detailed description of a preferred embodiment thereof, given by way of non limiting example, with reference to the attached drawing, in which:

FIG. 1b is an exploded view of the reclining device of FIG. 1a;

DETAILED DESCRIPTION OF A PREFERRED EMBODIMENT OF THE INVENTION

Figure 1A:
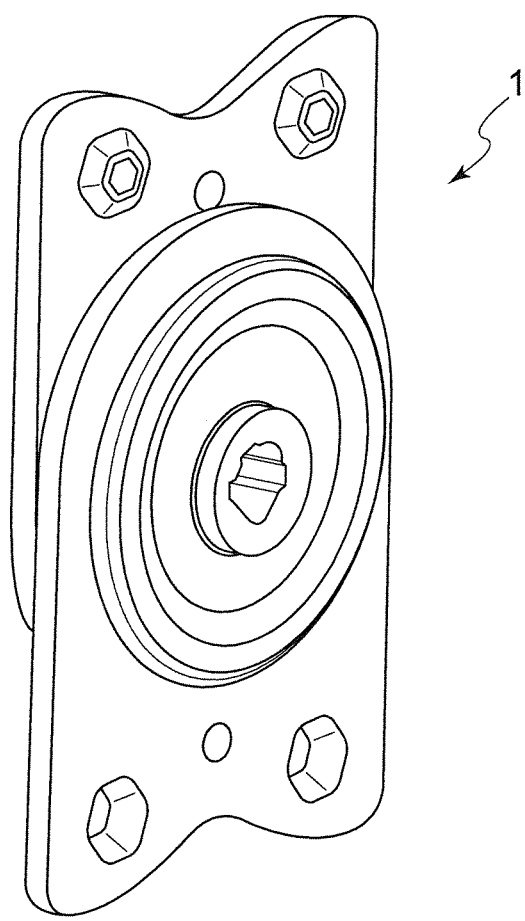
FIG. 1a is a perspective view of a reclining device according to the invention.
Figure 1B:
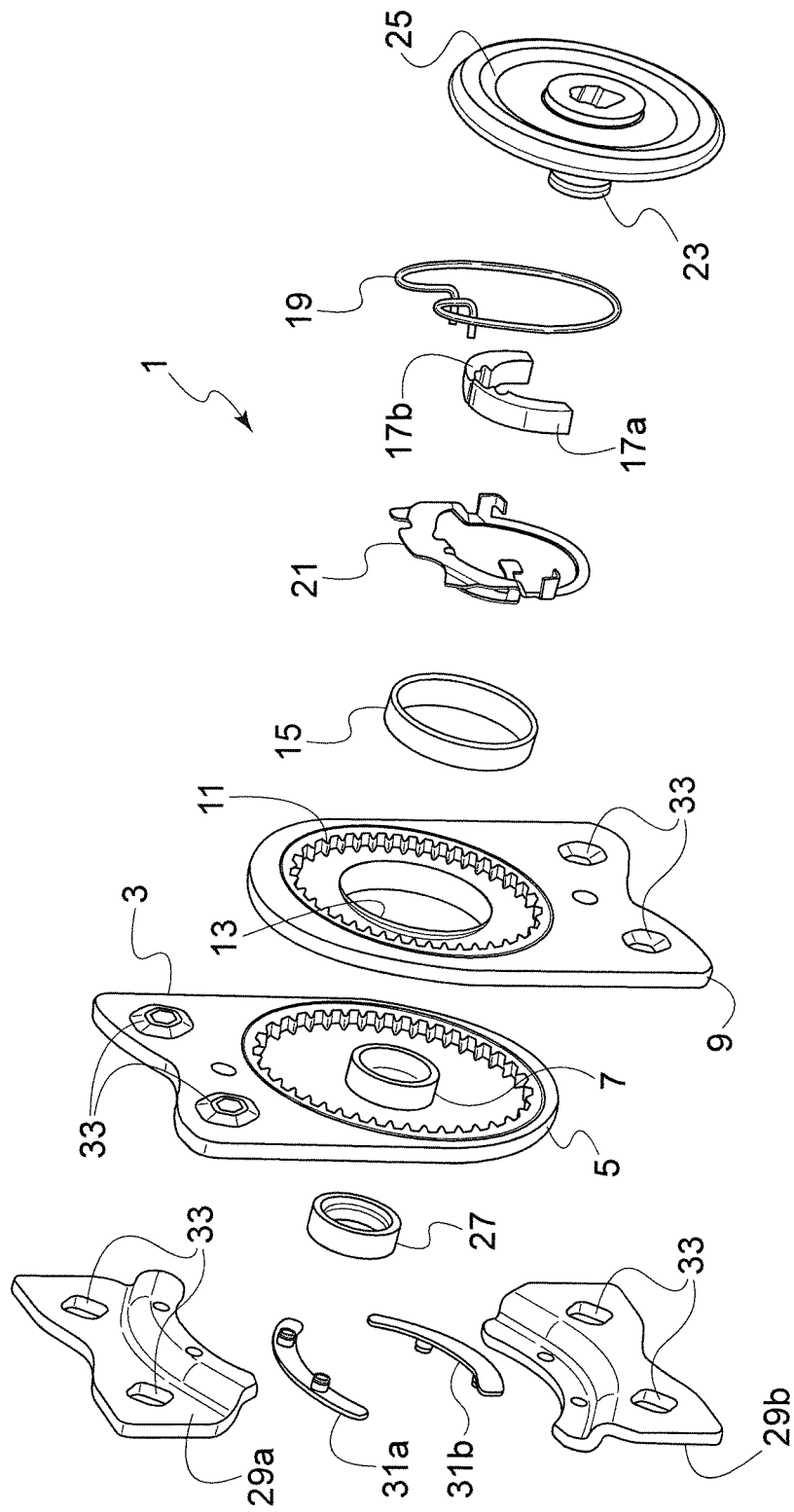

With reference to FIGS. 1a and 1b a reclining device 1 according to the invention is shown.

Said reclining device 1 comprises a first plate 3, which can be attached to a seat cushion (or to a seat backrest) and which include an internal gear 5, and a second plate 9, which can be attached to a seat backrest (or to a seat cushion) and which includes an external gear 11.

The external gear 11 comprise a central hole 13 through which the hub 7 of the internal gear 5 can be inserted, so that the external gear 11 and the internal gear 5 can cooperate. As better shown in FIG. 5, the internal gear 5 and external gear 11 are eccentrically arranged with respect to each other and the teeth of a portion (upper portion) of the outer circumference of the external gear 11 mesh with the teeth of a respective portion of the inner circumference of the internal gear 5.

The hub 7 of the internal gear 5 and a bearing 15 fitted to the central hole 13 of the external gear 11 define between them a crescent-shaped space which receives a first and second wedge elements 17a, 17b, which are arranged with their wider portions facing each other near the middle part of said crescent-shaped space and with their narrower portions oriented towards respective, opposite ends of said crescent-shaped space.

A wedge spring 19, which has an omega-shape comprising a circular portion ending with two, parallel arms, engages with its arms the wedge elements 17a, 17b and biases said wedge elements apart from each other, so that they are pushed towards the opposite ends of the crescent-shaped space and press against the surfaces of the hub 7 of the internal gear 5 and of the bearing 15 fitted to the central hole of the external gear 11.

Figure 6A:
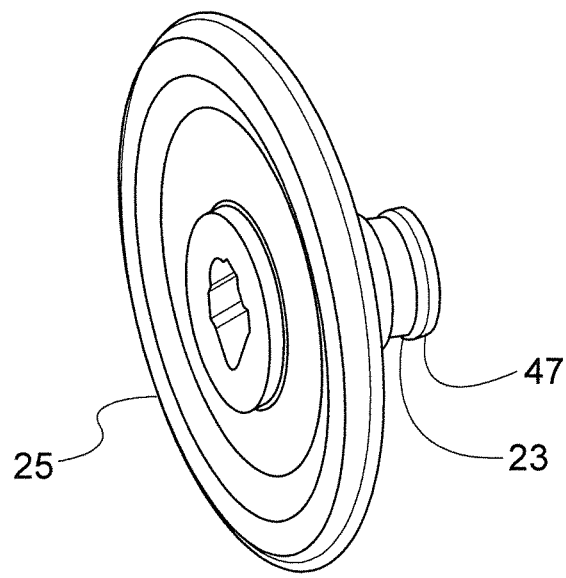
FIGS. 6a and 6b show in detail the driver and the dust cover of the reclining device of FIGS. 1a, 1b.
Figure 6B:
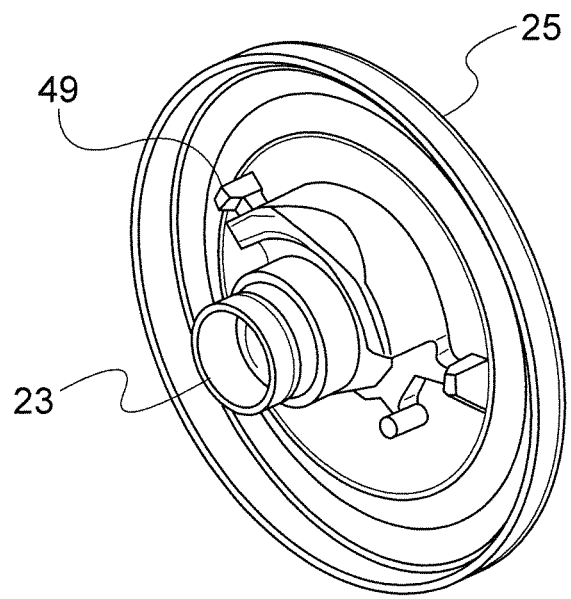

As better shown in FIGS. 6a, 6b, the reclining device includes a driver 23 which is arranged for acting of the wedge elements 17a, 17b for allowing the external gear and the internal gear to rotate relative to each other. The driver 23 is provided with a snap ring engaging a bushing 27 for packing the components of the reclining device together and restricting lateral movements of the reclining device.

The reclining device 1 further comprises a dust cover 25 for protecting the components of said reclining device from dust and dirt.

As shown in FIGS. 1a, 1b, the first and second plate 5, 9 are attached to respective brackets 29a, 29b with the interposition of respective clips 31a, 31b and by means of weld joints 33, preferably quadrilateral weld joints 33.

Always with reference to FIGS. 1a, 1b, the reclining device 1 further comprises a lock spring 21.

Figure 2A:
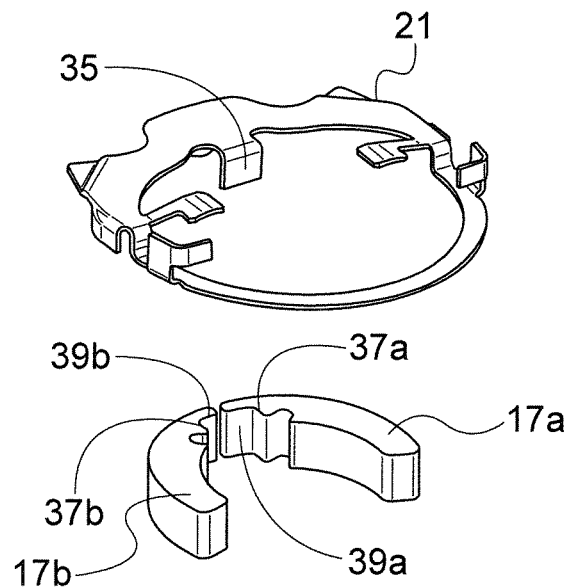
FIGS. 2a and 2b show in detail the engagement between the lock spring and the wedge elements of the reclining device of FIGS. 1a, 1b.
Figure 2B:
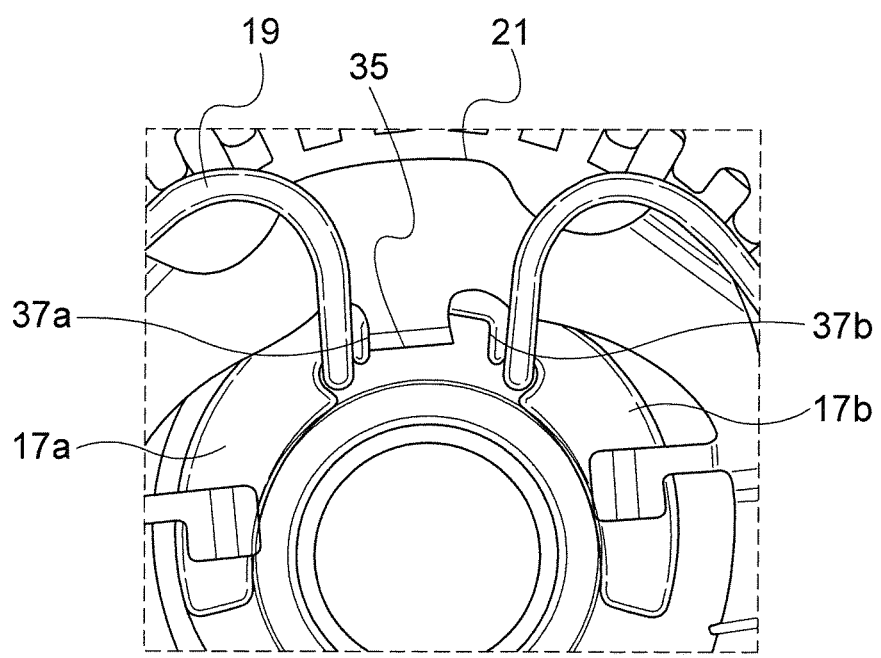

As better shown in FIGS. 2a, 2b, according to the invention, the lock spring 21 is configured to directly cooperate with the wedge elements 17a, 17b.

To this purpose, the lock spring 21, which has a body made as a thin plate, is provided with a wedge engaging element 35 that can be brought to abut and engage the first or the second wedge element.

In the shown embodiment, the wedge engaging element is made as a tab 35 which is bent so as to be substantially perpendicular to the plane of the body of the lock spring 21. Correspondingly, the wedge elements 17a, 17b are provided with respective lock spring abutment surfaces 37a, 37b against which the wedge engaging element of the lock spring can be brought to abut and engage.

In the shown embodiment, the wedge elements 17a, 17b, at their facing, wider ends, are provided with respective sliding surfaces 39a, 39b, which are substantially parallel to the bent tab 35 of the lock spring 21 and end with respective abutment surfaces 37a, 37b which are substantially perpendicular to said tab 35.

In a locked state of the reclining device, the wedge elements 17a, 17b may undergo slight rotations, as long as the sliding surfaces 39a, 39b move relative to the lock spring tab 35. More particularly, FIG. 2b shows a situation in which the first wedge element 17a has rotated in the clockwise direction (i.e. in the direction towards the middle part of the crescent-shaped space receiving the wedge elements) and the sliding surface 39a has moved relative and over the lock spring tab 35.

However, as soon as the lock spring tab 35 abuts and engages with the abutment surface 37a, 37b of the first or second wedge elements, a further rotation of the wedge elements is prevented.

More particularly, as clearly visible in FIG. 2b, as soon as the lock spring tab 35 has abutted the abutment surface 37a of the first wedge element 17a, a further rotation of the first wedge element in the clockwise direction (i.e. in the direction towards the middle part of the crescent-shaped space receiving the wedge elements) has been prevented.

Even if under a load the wedge elements have tendency to rotate, the abutment and engagement of the lock spring tab against the abutment surface of one of the wedge elements (as shown in FIG. 2b) will cause the lock spring to stop the wedge element, thus restricting its rotation.

The direct interaction between the lock spring 21 and the wedge elements 17a, 17b allows to avoid any loss of force and function between the lock spring and the wedge elements. Moreover, the lock spring 21 does not need to be interposed between the wedge spring 19 and the wedge elements 17a, 17b, but it can be arranged on the side of said wedge elements opposite to said wedge spring, as can be seen in FIG. 1b.

Figure 3:
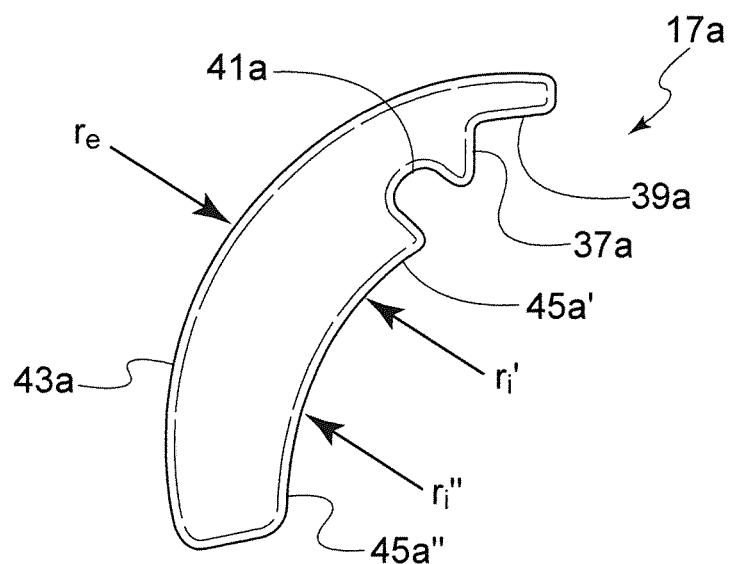
FIG. 3 shows in detail a wedge element of the reclining device of FIGS. 1a, 1b.

FIG. 3 shows in detail a wedge element, namely the first wedge element 17a, of the reclining device according to the invention.

In FIG. 3, the sliding surface 39a and the abutment surface 37a for the tab 35 of the lock spring 21 are clearly visible, as well as the seat 41a for the arm of the wedge spring 19. According to the shown embodiment of the present invention, the width of the wedge element 17a does not decrease from its wider end to its narrower end uniformly.

As can be seen in FIG. 3, the outer surface 43a of the wedge element 17a has a constant curvature radius $r_e$, while the inner surface of the wedge element is subdivided in a first section 45a', close to the wider end of the wedge element, having a first curvature radius $r_i'$ and a second section 45a'', close to the narrower end of the wedge element, having a second curvature radius $r_i''$, the first curvature radius being smaller than the second curvature radius.

This configuration of the wedge elements allows to reduce friction efforts during the operation of the reclining device.

Figure 4:
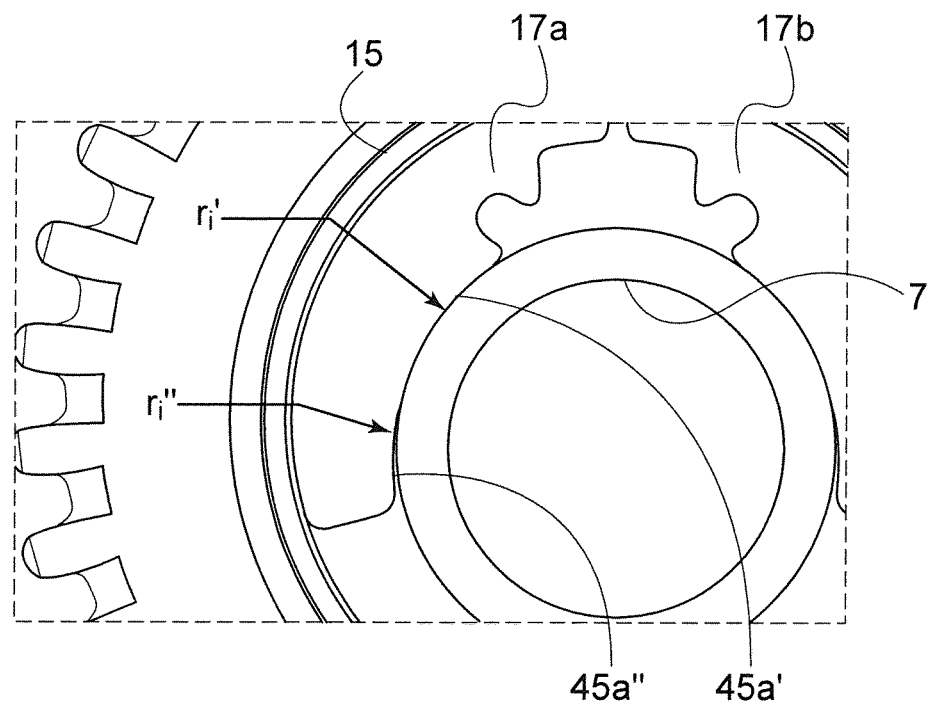
FIG. 4 shows in detail the engagement between the wedge elements and the hub of the internal gear of the reclining device of FIGS. 1a, 1b.

In fact, as shown in FIG. 4, only the first section 45a' of the inner surface of the wedge element 17a contacts the hub 7 of the internal gear 5, while a gap is formed between the second section 45a'' of the inner surface of the wedge element and said hub.

It will be evident to the person skilled in the art that the second wedge element 17b will have the same configuration (i.e. the same advantageous features) as the first wedge element shown in FIGS. 3, 4.

Figure 5:
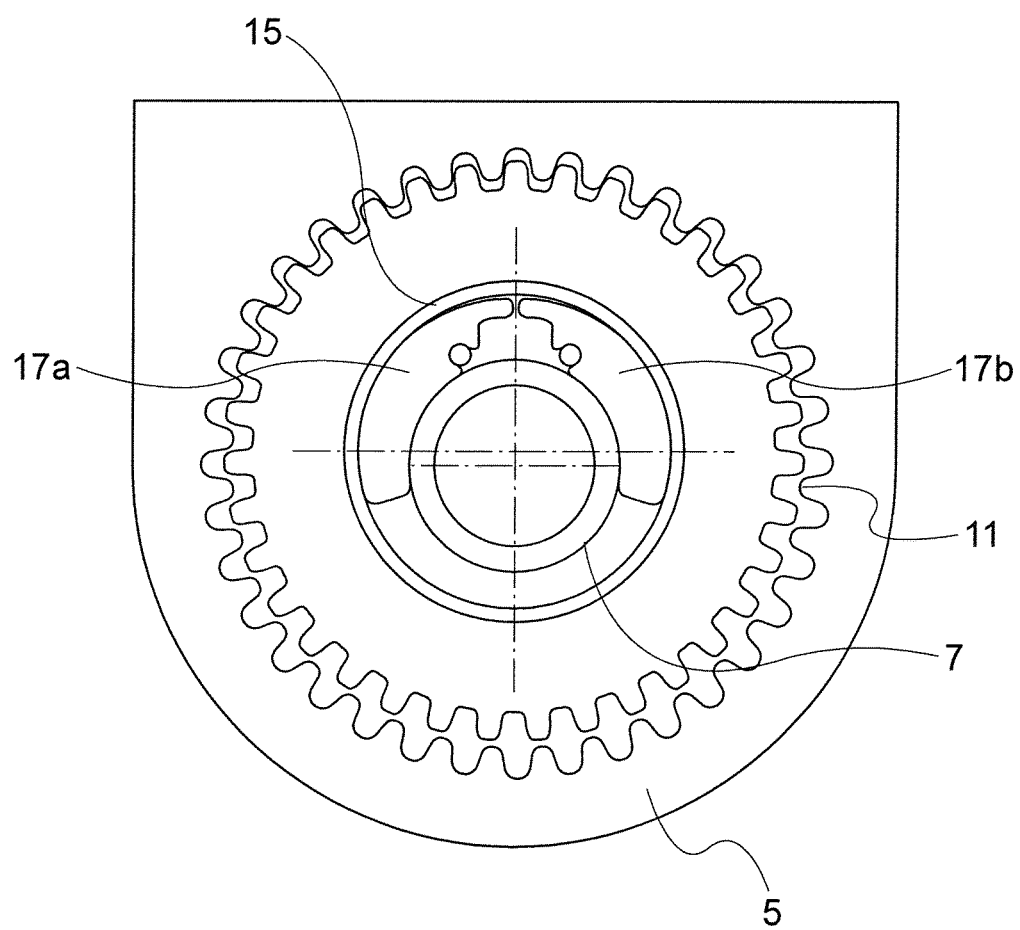
FIG. 5 shows in detail the engagement between the internal gear and the external gear of the reclining device of FIGS. 1a, 1b.

FIG. 5 shows in greater detail the engagement of the internal and external gears 5, 11.

In the shown embodiment, the number of teeth of the external gear 11 is lower than the number of teeth of the internal gear 5; preferably, the number of teeth of the external gear 11 is lower by one than the number of teeth of the internal gear 5.

According to the shown preferred embodiment, the number of teeth of the external gear 11 is 35 while the number of teeth of the internal gear 5 is 36.

The combination of such feature with the profile of the wedge elements shown in FIG. 3 advantageously allows to obtain a new involute trace.

Always with reference with FIG. 3, another relevant aspect of the invention can be set forth.

Thanks to the stepped contour of the wedge elements, and namely to the presence of the end portions comprising the sliding surfaces 39a, 39b, contact between the lock spring tab 35 and the inner surface of the bearing 15 fitted to the central hole 13 of the external gear 11 is always prevented.

The lock spring tab will move along the sliding surfaces 39a, 39b and it will be kept away from the inner surface of the bearing 15 by said sliding surfaces (as also shown in FIG. 2b).

Advantageously, any risk of rubbing of the lock spring tab 35 against the inner surface of the bearing 15 is effectively prevented.

In FIGS. 6a, 6b the driver 23 and the dust cover 25 of the reclining device 1 are shown in greater detail.

In the shown embodiment, said driver 23 and said dust cover 25 are made as a single piece.

The driver 23 includes a cam-shaped element which is configured to act either on the first wedge element 17a or on the second wedge element 17b, depending on the direction of rotation of the driver.

As mentioned before, the driver is provided at its distal end with a snap ring 47 which engages the bushing 27 (see FIG. 1b).

On the inner face of the dust cover 25, engaging means 49 for engaging the lock spring 21 and driving said lock spring 21 in rotation with the driver 33 in the locked state of the reclining device are also visible.

This description of a preferred embodiment of the invention has been given by way of mere example and several variants and modifications within the reach of the person skilled in the art can be envisaged, without departing form the scope of the invention as defined by the appended claims.

The invention claimed is:

1. A reclining device, comprising a first plate carrying an internal gear provided with teeth on an inner circumference thereof and a second plate carrying an external gear provided with teeth on an outer circumference thereof, the internal gear being provided with a hub and the external gear comprising a central hole through which the hub of the internal gear is inserted, the internal gear being eccentrically arranged with respect to the external gear so that the teeth of a portion of the outer circumference of the external gear mesh with the teeth of a respective portion of the inner circumference of the internal gear, wherein a bearing is fitted to the central hole of the external gear and a first and second wedge elements are arranged in the space between the hub and the bearing, the wedge elements being arranged with their wider portions facing each other near the middle part of the space and with their narrower portions oriented towards respective, opposite ends of the space, wherein a wedge spring is provided for biasing the wedge elements apart from each other, wherein the reclining device further comprise a driver which is configured to act on the wedge elements for allowing the external gear and the internal gear to rotate relative to each other, wherein the reclining device further comprises a lock spring, the lock spring being switchable from a locked state in which it is integral in rotation with the driver to an unlocked state in which it is no longer integral in rotation with the driver, and vice versa, wherein the lock spring comprises a wedge engaging element that can be brought to abut and engage the first or the second wedge element and the first and second wedge elements correspondingly comprise respective lock spring abutment surfaces against which the lock spring can be brought to abut and engage, wherein the lock spring has a body which is made as a thin plate and the wedge engaging element is made as a tab which is bent so as to be substantially perpendicular to the plane of the body of the lock spring and wherein each of the wedge elements is provided at its wider end with a sliding surface, which is substantially parallel to the tab of the lock spring and ends with the lock spring abutment surface, which is substantially perpendicular to the tab of the lock spring, whereby in the locked state of the lock spring the wedge elements rotate as long as the tab of the lock spring slides along the sliding surface of the first or second wedge element and further rotation of the wedge elements is prevented as soon as the tab of the lock spring abuts against the abutment surface of the first or second wedge element.

2. The reclining device according to claim 1, wherein the sliding surfaces of the wedge elements prevent the tab of the lock spring from coming into contact with the inner surface of the bearing.

3. The reclining device according to claim 1, wherein in each of the wedge elements an outer surface and an inner surface are defined, wherein each of the wedge elements has a width that decreases from the wider end to the narrower end of the wedge element and wherein the outer surface of the wedge element has a constant curvature radius, while the inner surface of the wedge element is subdivided in a plurality of sections having different curvature radii.

4. The reclining device according to claim 3, wherein the inner surface of the wedge element comprises at least a first section, close to the wider end of the wedge element, having a first curvature radius, and a second section, close to the narrower end of the wedge element, having a second curvature radius, the first curvature radius being smaller than the second curvature radius.

5. The reclining device according to claim 1, wherein the number of teeth of the external gear is lower than the number of teeth of the internal gear.

6. The reclining device according to claim 5, wherein the number of teeth of the external gear is lower by one than the number of teeth of the internal gear.

7. The reclining device according to claim 1, wherein the reclining device further comprises a dust cover and wherein the driver and the dust cover are made as a single piece.

8. The reclining device according to claim 1, wherein the driver is provided with a snap ring and wherein the reclining device further comprise a bushing which is engaged by the snap ring.

\* \* \* \* \*